(12) United States Patent
Zhang et al.

(10) Patent No.: US 11,620,779 B2
(45) Date of Patent: Apr. 4, 2023

(54) REMOTE VISUALIZATION OF REAL-TIME THREE-DIMENSIONAL (3D) FACIAL ANIMATION WITH SYNCHRONIZED VOICE

(71) Applicant: VanGogh Imaging, Inc., McLean, VA (US)

(72) Inventors: Xiang Zhang, McLean, VA (US); Xin Hou, Herndon, VA (US); Ken Lee, Fairfax, VA (US); Yasmin Jahir, McLean, VA (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 17/139,792

(22) Filed: Dec. 31, 2020

(65) Prior Publication Data

US 2021/0375020 A1    Dec. 2, 2021

Related U.S. Application Data

(60) Provisional application No. 62/956,758, filed on Jan. 3, 2020.

(51) Int. Cl.
*G06T 13/20*      (2011.01)
*G06T 7/246*      (2017.01)
            (Continued)

(52) U.S. Cl.
CPC ............ *G06T 13/205* (2013.01); *G06T 7/251* (2017.01); *G06T 7/90* (2017.01); *G06T 13/40* (2013.01); *G06T 13/80* (2013.01); *G06T 19/20* (2013.01); *G06V 40/10* (2022.01); *G06V 40/171* (2022.01); *G06T 2207/30201* (2013.01); *G06T 2219/2004* (2013.01); *G06T 2219/2012* (2013.01)

(58) Field of Classification Search
CPC .......... G06T 7/251; G06T 7/90; G06T 19/20; G06T 2207/30201; G06T 2219/2004; G06T 2219/2012; G06T 13/00–80; G06T 13/205; G06K 9/00281; G06K 9/00362
See application file for complete search history.

(56) References Cited

U.S. PATENT DOCUMENTS 10,467,792 B1 * 11/2019 Roche .................... G10L 25/57
2009/0202114 A1 * 8/2009 Morin .................... G06T 7/246
                                                                382/118

(Continued)

*Primary Examiner* — Daniel F Hajnik
(74) *Attorney, Agent, or Firm* — Cesari & McKenna, LLP

(57) ABSTRACT

Described herein are methods and systems for remote visualization of real-time three-dimensional (3D) facial animation with synchronized voice. A sensor captures frames of a face of a person, each frame comprising color images of the face, depth maps of the face, voice data associated with the person, and a timestamp. The sensor generates a 3D face model of the person using the depth maps. A computing device receives the frames of the face and the 3D face model. The computing device preprocesses the 3D face model. For each frame, the computing device: detects facial landmarks using the color images; matches the 3D face model to the depth maps using non-rigid registration; updates a texture on a front part of the 3D face model using the color images; synchronizes the 3D face model with a segment of the voice data using the timestamp; and transmits the synchronized 3D face model and voice data to a remote device.

16 Claims, 4 Drawing Sheets

(51) Int. Cl.
    *G06T 13/40*     (2011.01)
    *G06T 7/90*     (2017.01)
    *G06T 19/20*     (2011.01)
    *G06T 13/80*     (2011.01)
    *G06V 40/10*     (2022.01)
    *G06V 40/16*     (2022.01)

(56) References Cited

U.S. PATENT DOCUMENTS

| | | | |
|---|---|---|---|
| 2013/0097194 A1* | 4/2013 | Braga | G06F 16/5838 707/758 |
| 2017/0206694 A1* | 7/2017 | Jiao | G06T 7/246 |
| 2019/0172458 A1* | 6/2019 | Mishra | G10L 15/005 |
| 2019/0251728 A1* | 8/2019 | Stoyles | G06K 9/00228 |
| 2019/0304181 A1* | 10/2019 | Farahbakhshian | G06K 9/44 |
| 2021/0166461 A1* | 6/2021 | Riesen | G06T 1/60 |
| 2021/0209835 A1* | 7/2021 | Fonseka | G06T 15/205 |

* cited by examiner

REMOTE VISUALIZATION OF REAL-TIME THREE-DIMENSIONAL (3D) FACIAL ANIMATION WITH SYNCHRONIZED VOICE

RELATED APPLICATIONS

This application claims priority to U.S. Provisional Patent Application No. 62/956,758, filed Jan. 3, 2020, the entirety of which is incorporated herein by reference.

TECHNICAL FIELD

This subject matter of this application relates generally to methods and apparatuses, including computer program products, for remote visualization of real-time three-dimensional (3D) facial animation with synchronized voice.

BACKGROUND

As described in U.S. patent application Ser. No. 16/240,404, titled "4D Hologram: Real-Time Remote Avatar Creation and Animation Control" (now U.S. Pat. No. 10,839,535) and U.S. patent application Ser. No. 16/867,196, titled "Remote Visualization of Three-Dimensional (3D) Animation with Synchronized Voice in Real-Time" (both of which are incorporated herein by reference), 4D hologram technology enables the creation and control of a real-time remote avatar for delivering animated content (i.e., messages), particularly over low bandwidth networks.

SUMMARY

The invention described herein advantageously builds upon the 3D/4D hologram technology described in the above-referenced patent and patent application to enable the use of a depth sensor in a mobile device (e.g., smartphone) to scan a human face and transmit full 3D, animated messages including the human face and voice to a remote device (e.g., smartphone, augmented reality (AR)/virtual reality (VR) device) for display in real time.

The invention, in one aspect, features a system for remote visualization of real-time three-dimensional (3D) facial animation with synchronized voice. The system comprises a sensor device that (i) captures one or more frames of a face of a person, each frame comprising one or more color images of the person's face, one or more depth maps of the person's face, voice stream data associated with the person, and a timestamp, and (ii) generates a 3D face model of the person using the one or more depth maps. The system comprises a computing device coupled to the sensor device, the computing device comprising a memory that stores computer-executable instructions and a processor that executes the instructions. The computing device receives the one or more frames of the person's face and the 3D face model from the sensor device. The computing device preprocess the 3D face model. For each received frame, the computing device: detects facial landmarks using the one or more color images; matches the 3D face model to the one or more depth maps using non-rigid registration; updates a texture on a front part of the 3D face model using the one or more color images; synchronizes the 3D face model with a segment of the voice stream data using the timestamp; and transmits the synchronized 3D face model and voice stream data to a remote device for display.

The invention, in another aspect, features a computerized method of remote visualization of real-time three-dimensional (3D) facial animation with synchronized voice. A sensor device captures one or more frames of a face of a person, each frame comprising one or more color images of the person's face, one or more depth maps of the person's face, voice stream data associated with the person, and a timestamp. The sensor device generates a 3D face model of the person using the one or more depth maps. A computing device receives the one or more frames of the person's face and the 3D face model from the sensor device. The computing device preprocesses the 3D face model. For each received frame, the computing device: detects facial landmarks using the one or more color images; matches the 3D face model to the one or more depth maps using non-rigid registration; updates a texture on a front part of the 3D face model using the one or more color images; synchronizes the 3D face model with a segment of the voice stream data using the timestamp; and transmits the synchronized 3D face model and voice stream data to a remote device for display.

Any of the above aspects can include one or more of the following features. In some embodiments, the 3D face model comprises one or more of: a face of the person, a chest of the person, one or more shoulders of the person, and a back of a head of the person. In some embodiments, preprocessing the 3D face model comprises: loading the 3D face model into memory; and separating a part of the 3D face model corresponding to the face of the person from one or more other parts of the 3D face model. In some embodiments, the computing device preprocesses the 3D face model once at a beginning of a streaming session.

In some embodiments, detecting facial landmarks using the one or more color images comprises executing a pre-trained neural network model on the one or more color images to detect the facial landmarks. In some embodiments, the computing device updates a texture on a front part of the 3D face model using the one or more color images via a Poisson blending technique. In some embodiments, at least one of the computing device and the remote device comprises a mobile computing device. In some embodiments, the computing device comprises a System-on-Chip (SoC) module to execute at least a portion of the computer-executable instructions.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
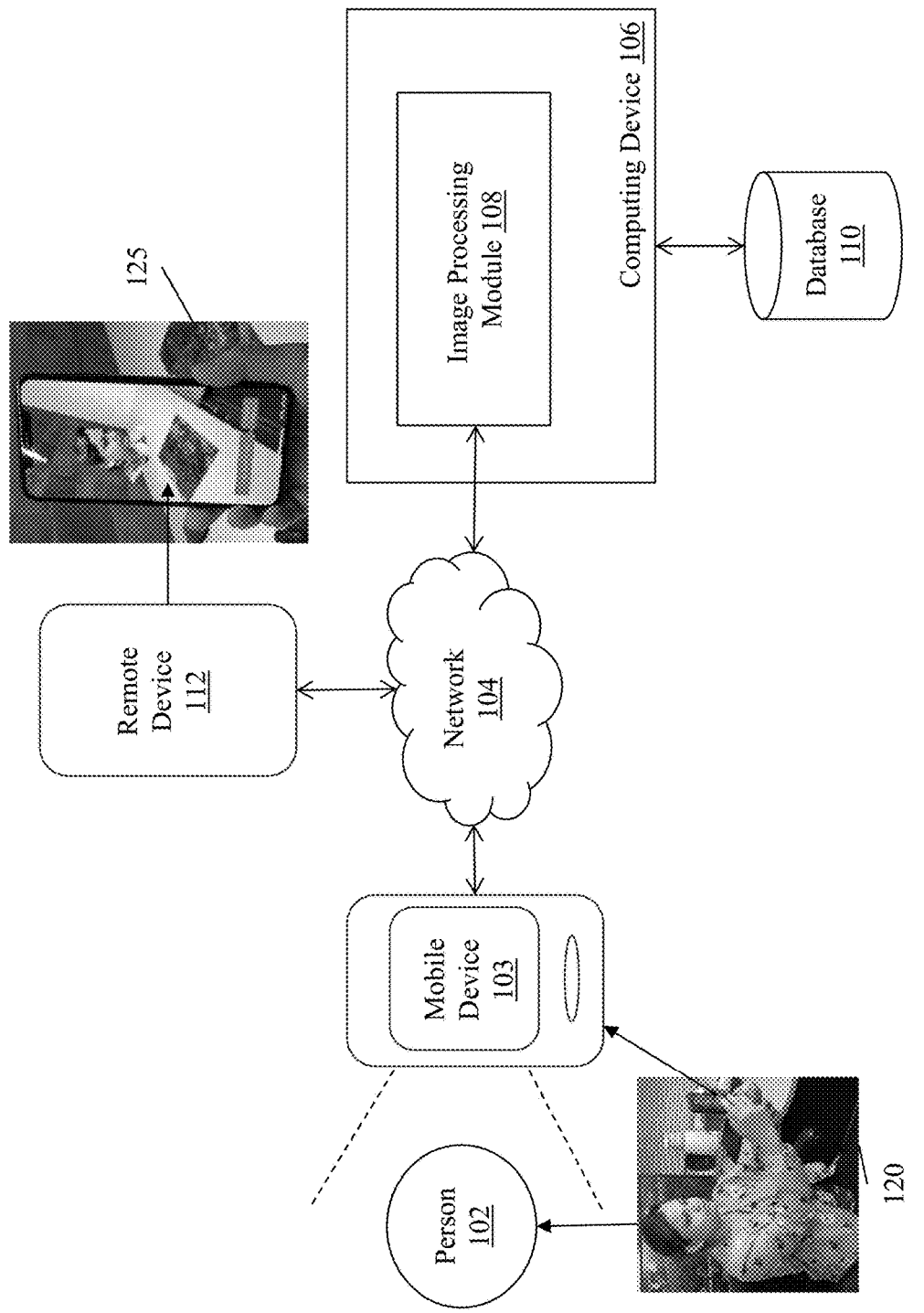
FIG. 1 is a block diagram of a system for real-time remote visualization of three-dimensional (3D) facial animation with synchronized voice.

FIG. 1 is a block diagram of a system 100 for real-time remote visualization of three-dimensional (3D) facial animation with synchronized voice. The system includes a mobile device 103 (e.g., a smartphone, tablet, or other type of mobile computing device that is capable of streaming depth images, color images and voices) coupled to a communications network 104 that connects the mobile device 103 to a computing device 106. The computing device 106 includes an image processing module 108. In some embodiments, the computing device 106 can also be coupled to a data storage module 110, e.g., database used for storing certain 3D models, color images, and other data as described herein. The mobile device 103 includes a camera or other sensor device (e.g., embedded in the device), which is positioned to capture data (such as color images, depth images, audio stream of a voice, 3D face model) of a scene 101 which includes one or more people (e.g., person 102). It should be appreciated that the scene may contain other objects in addition to the people. In some embodiments, the mobile device 103 can generate the 3D face model locally using, e.g., hologram reconstruction as described in U.S. patent application Ser. No. 16/240,404 (now U.S. Pat. No. 10,839,535), titled "4D Hologram: Real-Time Remote Avatar Creation and Animation Control" and U.S. patent application Ser. No. 16/867,196, titled "Remote Visualization of Three-Dimensional (3D) Animation with Synchronized Voice in Real-Time" (both incorporated herein by reference in their entirety) before transmitting the 3D face model to computing device 106. Exemplary mobile devices 103 include but are not limited to: smartphones such as the Apple® iPhone® 11 and iPhone® 12 with an embedded camera (e.g., TrueDepth camera) to capture images and microphone apparatus to record voice data.

The computing device 106 is a combination of hardware and software modules that includes specialized hardware and/or software modules that execute on a processor and interact with memory modules of the computing device 106, to receive data from the database 110, to transmit data to the database 110, and to communicate with the other devices of the system 100 (e.g., mobile device 103, mobile device 112) in order to perform functions for real-time remote visualization of three-dimensional (3D) facial animation with synchronized voice as described herein. In some embodiments, the functionality of the computing device 106, including but not limited to the image processing module 108, can be located within mobile device 103. It should be appreciated that other computing devices can be used without departing from the scope of the invention. The mobile devices 103, 112 and the computing device 106 each includes network-interface components to connect to communications network 104. In some embodiments, the network-interface components include components to connect to a wireless network, such as a Wi-Fi or cellular network, in order to access a wider network, such as the Internet.

The computing device 106 receives the above-referenced data (e.g., color images, depth images, audio stream, 3D face model) of the person 102 as captured by the camera and microphone of the mobile device 103 and processes the received data to generate a real-time animated model of the face of the person 102 represented in the scene 101 along with synchronized voice. As shown in image 120 of FIG. 1, a person 102 can hold a mobile device 103 and capture the above-mentioned data.

The computing device 106 includes an image processing module 108 configured to receive the data captured by the mobile device 103 and analyze the data in a variety of ways, including detecting information (e.g., facial landmarks) associated with the face of the person 102 represented in the images, preprocessing the 3D face model received from the mobile device 103, and so forth. In some embodiments, the computing device 106 can generate the 3D face model locally using the same or similar techniques as the mobile device 103 does (described above).

The image processing module 108 is a hardware and/or software module that resides on the computing device 106 to perform functions associated with analyzing data captured by the mobile device 103. In some embodiments, the functionality of the image processing module 108 is distributed among a plurality of computing devices. In some embodiments, the image processing module 108 operates in conjunction with other modules that are either also located on the computing device 106 or on other computing devices coupled to the computing device 106. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from VanGogh Imaging, Inc. of McLean, Va.

It should be appreciated that in one embodiment, the image processing module 108 comprises specialized hardware (such as a processor or system-on-chip) that is embedded into, e.g., a circuit board or other similar component of another device. In this embodiment, the image processing module 108 is specifically programmed with the image processing and modeling software functionality described below.

Figure 2:
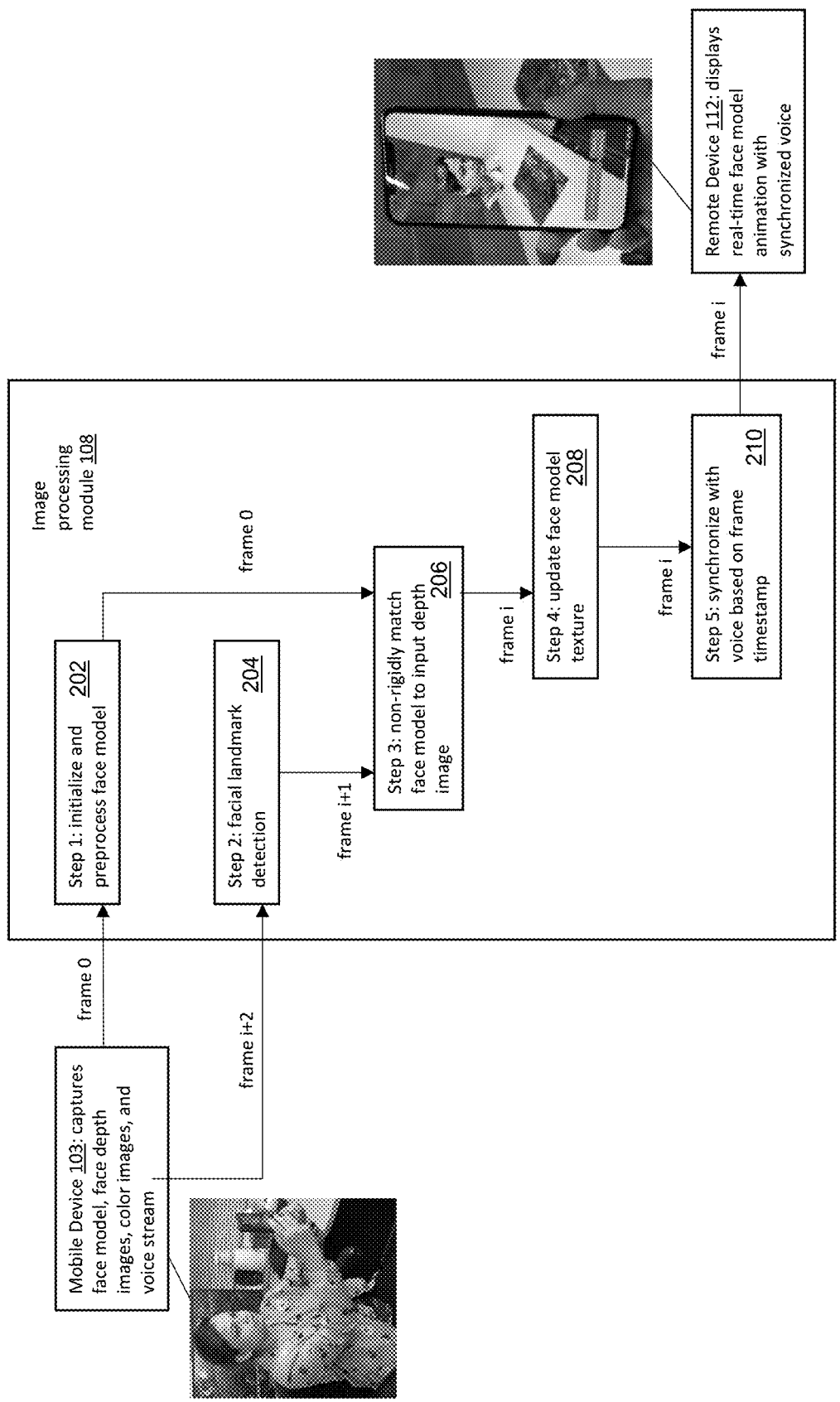
FIG. 2 is a flow diagram of a computerized method of real-time remote visualization of three-dimensional (3D) facial animation with synchronized voice.

FIG. 2 is a flow diagram of a computerized method 200 of real-time remote visualization of three-dimensional (3D) facial animation with synchronized voice, using the system 100 of FIG. 1. The mobile device 103 captures one or more color images and/or depth images of the face of the person 102 in the scene 101. The mobile device 103 also captures audio data of the voice of the person 102 in the scene using, e.g., the microphone embedded in the mobile device 103 (for example, as the person is talking). The mobile device 103 further generates a 3D model of the person's face using, e.g., hologram reconstruction techniques as described in U.S. patent application Ser. No. 16/240,404 (U.S. Pat. No. 10,839,535), titled "4D Hologram: Real-Time Remote Avatar Creation and Animation Control" and U.S. patent application Ser. No. 16/867,196, titled "Remote Visualization of Three-Dimensional (3D) Animation with Synchronized Voice in Real-Time" (both incorporated herein by reference in their entirety). In some embodiments, the mobile device 103 can stream the captured data over the network 104 (e.g., wirelessly or via a wired connection) to the image processing module 108 of computing device 106.

The image processing module 108 preprocesses (202) the 3D face model received from the mobile device 103. The module 108 first loads the 3D face model, e.g., into memory, and then separates the front part (i.e., the face area) of the 3D face model from other portions of the 3D face model (such as chest, shoulder, and back of head)—in order to speed up the animation process. It should be appreciated that during the animation process, the image processing module 108 mainly updates the geometry and texture of the front part of the face model and for the rest of the face model, the module 108 keeps the texture constant and updates only the geometry based on the front face geometry updates. Also, it should be appreciated that in some embodiments the 3D face model is initialized and preprocessed only once (e.g., at the beginning of the streaming session).

Figure 3:
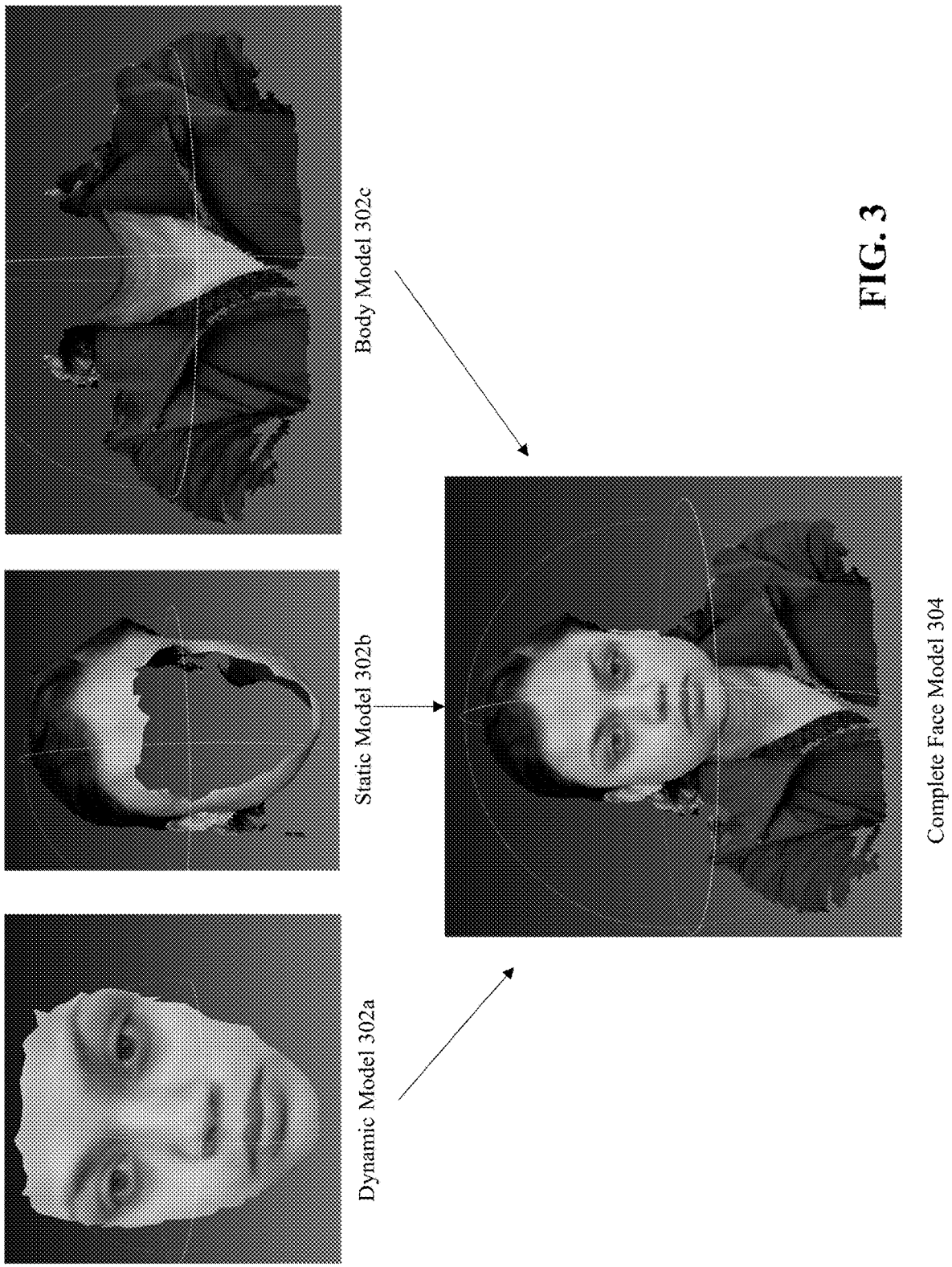
FIG. 3 depicts exemplary 3D meshes of dynamic, static and body models.

FIG. 3 depicts an exemplary complete 3D face model 304 generated by the image processing module 108, as well as the separated parts (i.e., chest and shoulder 302c, back of face 302b and the front face 302a). As shown in FIG. 3, in this example there are three parts—(i) the front face, called the dynamic model 302a (which dynamically changes texture and geometry during animation), (ii) the rest of the head, called the static model 302b (which comprises static texture and mostly static geometry, except at the boundary with the front face model 302a and the body model 302c), and (iii) the body model 302c (only the geometry where the body connects to the head changes during animation).

The image processing module 108 then detects (204) facial landmarks in the color images of the person's face based on a pre-trained neural network model. An exemplary pre-trained neural network model that can be used by the image processing module 108 is described in B. Amos, B. Ludwiczuk, M. Satyanarayanan, "Openface: A general-purpose face recognition library with mobile applications," CMU-CS-16-118, CMU School of Computer Science, Tech. Rep., 2016 (which is incorporated herein by reference). The facial landmarks are further used by the module 108 for non-rigid registration and facial animation.

Figure 4:
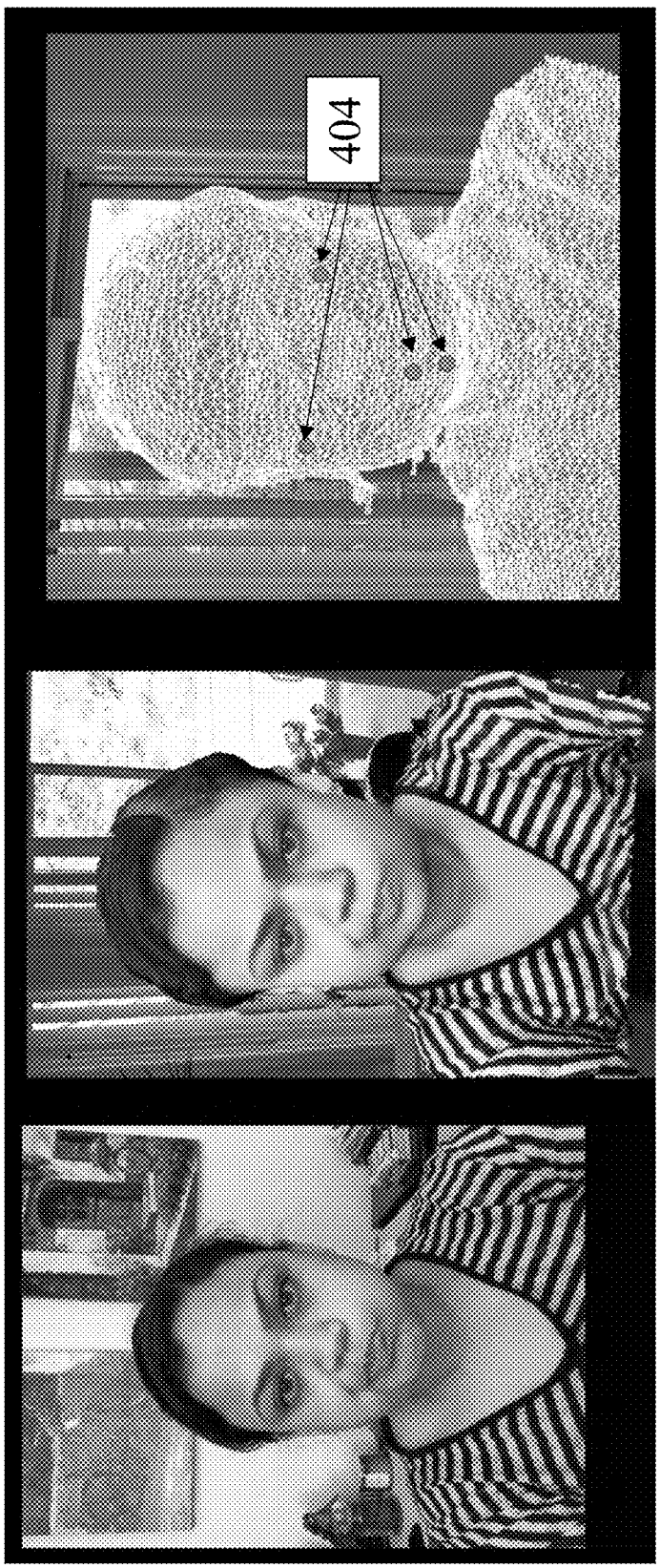
FIG. 4 depicts facial landmarks used in non-rigid registration to capture the deformation of the face during animation.

FIG. 4 depicts exemplary facial landmarks 404 (shown as dots on the mesh 402c) detected by the image processing module 108 and used in non-rigid registration to capture the deformation of the face during animation. As shown in FIG. 4, the image processing module uses the input image 402a to detect a plurality of facial landmarks (e.g., cheeks, chin, mouth, etc.) and locate the facial landmarks 404 on the mesh 402c. Then, the image processing module 108 can use the plurality of facial landmarks 404 to animate the mesh and, along with the texture captured from the input image, generate an animated model 402b.

The image processing module 108 then matches (206) the preloaded 3D face model to the depth images received from the mobile device 103 using non-rigid registration based on, e.g., techniques as described in R. A. Newcombe et al., "DynamicFusion: Reconstruction and Tracking of Non-rigid Scenes in Real-Time," *Proceedings of the IEEE Conference on Computer Vision and Pattern Recognition (CVPR)*, 2015, pp. 343-352 (which is incorporated herein by reference). Also, the facial landmarks as detected in the previous step can serve as additional information to improve the accuracy and the speed of the non-rigid registration. As can be appreciated, input images are captured by the image processing module 108 as the person's face moves (e.g., in the example of FIG. 4, in input image 402a the person has moved her mouth slightly to the right side of her face). The 3D face model (e.g., mesh 402c) is updated using non-rigid registration by, e.g., moving the facial landmarks to match the input image 402a and indicate the deformation. As a result, the animated model 402b is changed to reflect the update to the 3D face model and as described below, the texture of the 3D face model is also updated.

To achieve real-time animation, the image processing module 108 updates (208) the texture of the 3D face model on the front part of the face. The module 108 uses, e.g., Poisson blending to seamlessly match the front face texture to the texture of the rest of the 3D face model. An exemplary Poisson Blending technique is set forth in Patrick Perez et al., "Poisson Image Editing," ACM Trans. Graph. 22, 3, 313-318 (2003), which is incorporated herein by reference. Another exemplary Poisson Blending technique is described at en.wikipedia.org/wiki/Gradient-domain_image_processing (which is incorporated herein by reference).

To speed up the entire 3D face model animation procedure and achieve real-time animation, the module 108 can in some embodiments implement a processing pipeline for steps 204, 206, and 208 described above. For example, while the mobile device 103 streams frame i to the image processing module 108, instead of waiting for frame i to go through all the above-described steps 204, 206, 208 before processing the subsequent frame i+1, the module 108 immediately applies step 204 to the next incoming frame (i.e., frame i+1) after the module 108 completes step 204 with frame i. Then, the module 108 applies step 206 to frame i while the module 108 concurrently applies step 204 to frame i+. When the module 108 has applied steps 204, 206, and 208 using frame i, the mobile device 103 has already started to stream frame i+2 to the image processing module 108. It should be acknowledged that the pipelining process described above creates a delay of two frames, but that is counteracted by a noticeable speed up in the frame rate-resulting in a real-time animation.

The image processing module 108 then synchronizes (210) the frame with the audio stream of the person's voice. When received from the mobile device 103, both the frames and the voice stream include a timestamp. After the image processing module 108 finishes the geometry and texture animation process described above for each frame, the module 108 synchronizes the frame with voice data based upon the timestamp. For example, the voice stream is divided into segments based on the timestamps. The image processing module 108 plays the voice segment between the timestamp associated with frame i and the timestamp associated with frame i+1 after the module finishes applying step 208 to frame i. In some embodiments, there may be a time delay (i.e., caused by processing delays in the mobile device 103, network lag between the mobile device 103 and the computing device 106, etc.) between receipt of animation frames and voice segments (or vice versa). In either case, the corresponding lagged data can be skipped by the image processing module 108 (e.g., by discarding frames and/or voice segments that are associated with a timestamp that is beyond a certain threshold behind the current time), and the image processing module 108 can catch up to current data and stay synchronized.

The image processing module 108 then transmits the animated 3D face model and voice segment to a display device (e.g., remote device 112) for display to a user as a real-time animation. Exemplary remote devices 112 can include but are not limited to, smartphones (e.g., iPhone®), AR/VR devices (e.g., Oculus Quest™), and other connected devices (e.g., smart televisions, etc.). As shown in image 125 of FIG. 1, an animated 3D face model of the person 102 is displayed on remote mobile device 112.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for remote visualization of real-time three-dimensional (3D) facial animation with synchronized voice, the system comprising:
   a sensor device that (i) captures one or more frames of a face of a person, each frame comprising one or more color images of the person's face, one or more depth maps of the person's face, voice stream data associated with the person, and a timestamp, and (ii) generates a 3D face model of the person using the one or more depth maps;

a computing device coupled to the sensor device, the computing device comprising a memory that stores computer-executable instructions and a processor that executes the instructions to:

receive the one or more frames of the person's face and the 3D face model from the sensor device;

preprocess the 3D face model;

for each received frame:

detect facial landmarks using the one or more color images;

match the 3D face model to the one or more depth maps using non-rigid registration;

update a texture on a portion of the 3D face model corresponding to the person's face using the one or more color images, wherein the texture comprises a cropped portion of one or more of the color images, comprising:

keeping the texture constant on remaining portions of the 3D face model, and after updating the texture on the portion of the 3D face model corresponding to the person's face, blending a portion of the texture on the portion of the 3D face model corresponding to the person's face to match the texture on adjacent portions of the 3D face model;

synchronize the 3D face model with a segment of the voice stream data using the timestamp; and transmit the synchronized 3D face model and voice stream data to a remote device for display.

2. The system of claim 1, wherein the 3D face model comprises one or more of: a face of the person, a chest of the person, one or more shoulders of the person, and a back of a head of the person.

3. The system of claim 2, wherein preprocessing the 3D face model comprises:

loading the 3D face model into memory; and separating a part of the 3D face model corresponding to the face of the person from one or more other parts of the 3D face model.

4. The system of claim 1, wherein the computing device preprocesses the 3D face model once at a beginning of a streaming session.

5. The system of claim 1, wherein detecting facial landmarks using the one or more color images comprises executing a pre-trained neural network model on the one or more color images to detect the facial landmarks.

6. The system of claim 1, wherein synchronizing the 3D face model with a segment of the voice stream data using the timestamp comprises:

determining that the timestamp associated with the frame is delayed based upon a current time; and discarding one or more of (i) the segment of the voice segment data or (ii) the frame.

7. The system of claim 1, wherein detecting facial landmarks using the one or more color images comprises:

generating a control point animation map for the 3D face model using the detected facial landmarks by locating the detected facial landmarks in 3D space using the 3D face model, including triangulating each of the detected facial landmarks using a triangulation function, and extracting a 3D deformation for each point in the 3D face model using the located facial landmarks; and mapping the control point animation map to the 3D face model to generate a mapped 3D face model.

8. A computerized method of remote visualization of real-time three-dimensional (3D) facial animation with synchronized voice, the method comprising:

capturing, by a sensor device, one or more frames of a face of a person, each frame comprising one or more color images of the person's face, one or more depth maps of the person's face, voice stream data associated with the person, and a timestamp;

generating, by the sensor device, a 3D face model of the person using the one or more depth maps;

receiving, by a computing device, the one or more frames of the person's face and the 3D face model from the sensor device;

preprocessing, by the computing device, the 3D face model;

for each received frame:

detecting, by the computing device, facial landmarks using the one or more color images;

matching, by the computing device, the 3D face model to the one or more depth maps using non-rigid registration;

updating, by the computing device, a texture on a portion of the 3D face model corresponding to the person's face using the one or more color images, wherein the texture comprises a cropped portion of one or more of the color images, comprising:

keeping the texture constant on remaining portions of the 3D face model, and after updating the texture on the portion of the 3D face model corresponding to the person's face, blending a portion of the texture on the portion of the 3D face model corresponding to the person's face to match the texture on adjacent portions of the 3D face model;

synchronizing, by the computing device, the 3D face model with a segment of the voice stream data using the timestamp; and transmitting, by the computing device, the synchronized 3D face model and voice stream data to a remote device for display.

9. The method of claim 8, wherein the 3D face model comprises one or more of: a face of the person, a chest of the person, one or more shoulders of the person, and a back of a head of the person.

10. The method of claim 9, wherein preprocessing the 3D face model comprises:

loading the 3D face model into memory; and separating a part of the 3D face model corresponding to the face of the person from one or more other parts of the 3D face model.

11. The method of claim 8, wherein the computing device preprocesses the 3D face model once at a beginning of a streaming session.

12. The method of claim 8, wherein detecting facial landmarks using the one or more color images comprises executing a pre-trained neural network model on the one or more color images to detect the facial landmarks.

13. The method of claim 8, wherein synchronizing the 3D face model with a segment of the voice stream data using the timestamp comprises:

determining that the timestamp associated with the frame is delayed based upon a current time; and discarding one or more of (i) the segment of the voice segment data or (ii) the frame.

14. The method of claim 8, wherein detecting facial landmarks using the one or more color images comprises:
generating a control point animation map for the 3D face model using the detected facial landmarks by locating the detected facial landmarks in 3D space using the 3D face model, including triangulating each of the detected facial landmarks using a triangulation function, and extracting a 3D deformation for each point in the 3D face model using the located facial landmarks; and
mapping the control point animation map to the 3D face model to generate a mapped 3D face model.

15. A system for remote visualization of real-time three-dimensional (3D) facial animation with synchronized voice, the system comprising:
a sensor device that (i) captures one or more frames of a face of a person, each frame comprising one or more color images of the person's face, one or more depth maps of the person's face, voice stream data associated with the person, and a timestamp, and (ii) generates a 3D face model of the person using the one or more depth maps;
a computing device coupled to the sensor device, the computing device comprising a memory that stores computer-executable instructions and a processor that executes the instructions to:
receive the one or more frames of the person's face and the 3D face model from the sensor device;
preprocess the 3D face model;
for each received frame:
detect facial landmarks using the one or more color images, comprising:
generating a control point animation map for the 3D face model using the detected facial landmarks by locating the detected facial landmarks in 3D space using the 3D face model, including triangulating each of the detected facial landmarks using a triangulation function, and extracting a 3D deformation for each point in the 3D face model using the located facial landmarks, and
mapping the control point animation map to the 3D face model to generate a mapped 3D face model;
match the 3D face model to the one or more depth maps using non-rigid registration;
update a texture on a portion of the 3D face model corresponding to the person's face using the one or more color images, wherein the texture comprises a cropped portion of one or more of the color images;
synchronize the 3D face model with a segment of the voice stream data using the timestamp; and
transmit the synchronized 3D face model and voice stream data to a remote device for display.

16. A computerized method of remote visualization of real-time three-dimensional (3D) facial animation with synchronized voice, the method comprising:
capturing, by a sensor device, one or more frames of a face of a person, each frame comprising one or more color images of the person's face, one or more depth maps of the person's face, voice stream data associated with the person, and a timestamp;
generating, by the sensor device, a 3D face model of the person using the one or more depth maps;
receiving, by a computing device, the one or more frames of the person's face and the 3D face model from the sensor device;
preprocessing, by the computing device, the 3D face model;
for each received frame:
detecting, by the computing device, facial landmarks using the one or more color images, comprising:
generating a control point animation map for the 3D face model using the detected facial landmarks by locating the detected facial landmarks in 3D space using the 3D face model, including triangulating each of the detected facial landmarks using a triangulation function, and extracting a 3D deformation for each point in the 3D face model using the located facial landmarks, and
mapping the control point animation map to the 3D face model to generate a mapped 3D face model;
matching, by the computing device, the 3D face model to the one or more depth maps using non-rigid registration;
updating, by the computing device, a texture on a portion of the 3D face model corresponding to the person's face using the one or more color images, wherein the texture comprises a cropped portion of one or more of the color images;
synchronizing, by the computing device, the 3D face model with a segment of the voice stream data using the timestamp; and
transmitting, by the computing device, the synchronized 3D face model and voice stream data to a remote device for display.

* * * * *